Patented Mar. 4, 1941

2,233,428

UNITED STATES PATENT OFFICE 2,233,428

EMBALMING FLUID

William B. O'Brien, Brookline, Mass., assignor to The Dodge Chemical Company, Boston, Mass., a corporation of Massachusetts No Drawing. Application May 27, 1939, Serial No. 276,091

14 Claims. (Cl. 27—21)

This invention relates to embalming fluid compositions and to the method of embalming therewith.

In the art of embalming it has for a long period been customary to employ embalming fluids containing formaldehyde as the principal active embalming ingredient. Formaldehyde is peculiarly effective for this purpose, but it has certain inherent properties which constitute limitations upon its convenient and satisfactory use, per se.

Thus formaldehyde is normally a gaseous compound of low boiling point. If it vaporizes into the air it is extremely discomforting to those in the vicinity and may cause serious physiological consequences in even relatively low concentrations. It is accordingly not practicable to handle it in pure condition, and it is also not feasible to employ it in the embalming operation in pure liquid or gaseous condition, for other reasons which will be obvious, especially to those skilled in the art of embalming. The invariable application of formaldehyde for this purpose is therefore carried out in the form of an aqueous solution.

Formaldehyde dissolves freely in water but the resulting solution can be held at a maximum strength of approximately 37% by weight or 40 to 42% by volume. The addition of other soluble substances to the solution will generally tend to affect the solubility of the formaldehyde and may oppose dissolution of the formaldehyde or expel it from solution if already dissolved. In the latter case, the formaldehyde will appear and separate as a liberated gas. In other cases, addition of these substances may cause polymerization of individual formaldehyde molecules present, with the effect that a varying, irregular activity and result can not be avoided when using such solutions of formaldehyde in the process of embalming.

Since these fundamental physical and chemical properties of formaldehyde can not be changed they constitute certain limitations upon its application for embalming. At the same time it is chemically the most effective embalming reagent which is known.

It is therefore an object of the present invention to provide a method of preparing embalming compositions which shall result in an improved product, which are safer to handle and more satisfactory and convenient in the embalming operation, and at the same time as effective, or even more effective than formaldehyde, per se. Other objects will appear from the following disclosure.

It is now found that certain chemical compounds of formaldehyde may be made, which are characterized by containing a large proportion of formaldehyde, in chemical association, and which are safely handled, substantially non-volatile, and non-reactive, per se, but in which the formaldehyde is so lightly bound in such association that the compound may be subjected to conditions under which it will dissociate and liberate the formaldehyde substantially quantitatively. As thus liberated, the formaldehyde is more reactive than an aqueous solution of it and is hence especially effective chemically upon its immediate environment.

Such compounds are formed by the reaction of an aliphatic or other alcohol and an aldehyde (in the presence of a mineral acid) and are generically of the class known as acetals, but more particularly comprise the formaldehyde derivatives of this class, known as formals.

It is further found, as a part of the present invention, that these acetals and formals, (and more especially the derivative of ethylene glycol and formaldehyde, hereinafter in this application to be referred to as glycol formal) when brought into contact with the natural fluids in the cavities and vascular system of the body, as well as on and in the moist cell walls and tissues, are not only competent to wet the same freely but to penetrate and diffuse through them promptly and uniformly. Moreover, upon or after effecting such contact and penetration, or diffusion, the compounds are gradually dissociated or hydrolyzed, thus liberating free formaldehyde. This reagent, as thus liberated in nascent form and undiluted, is free and especially active still further to disperse and dissolve in the body fluids of the tissues, vascular system and body cavities, and to react in concentrated form immediately upon the cell contents, walls, tissues, and the like, with which it is already associated prior to its liberation. Furthermore, due to this association before liberation of the formaldehyde, this reaction is effected substantially uniformly throughout the tissues, cavities, and vascular system of the body. This is made possible because the compounds are soluble as such in the aqueous body fluids contained therein and while the liberation of formaldehyde is fairly prompt, it does not take place at once, as for example in the entrant portion of the system, into which the embalming fluid containing the compound has been introduced. It is also known that the rate of hydrolysis of acetals or formals can be regulated by presence of chemicals such as inorganic acids, bases and salts, advantageously to the purpose desired. Hence, the compound may and does reach the most remote areas of the system, before appreciable dissociation and liberation of the formaldehyde component occurs.

It is also found that simultaneously with liberation of formaldehyde by hydrolysis of the formals, another substance, namely the alcohol of the radical associated therewith, such as ethylene glycol, is formed and liberated in equivalent molecular proportion to the formaldehyde. Some of these alcohols, and ethylene glycol in particular, are freely miscible with and soluble in the liquids of the body. They are accordingly helpful to the embalming action of the formaldehyde, combining with and preserving the tissues by maintaining the liquid bulk or volume of the aqueous fluids of the body, that have been used up in the hydrolysis reaction and also affording compatibility and contact with the tissues being preserved.

It is further found that, just as the compound glycol formal undergoes the reaction described above, other compounds of the class of acetals or formals can be used and will undergo similar kinds of reaction. But the effect varies in degree of usefulness according to the individual composition of each acetal and it is discovered that the effectiveness of the reaction can be varied and improved by employing both mixtures of different acetals and "mixed" acetals, meaning thereby physical mixtures of two or more individual compounds of the acetals, and acetals constituting single compounds containing different chemical substituents in the molecules, respectively. The compounds which are thus found to be applicable for embalming purposes are structurally composed of an aldehyde, or more especially a formaldehyde residue, and a monohydric or polyhydric alcohol or aliphatic derivation.

Such compounds may be represented by the formula:

in which the symbols R and R' may be alike or may be different, but represent radicals of the alcohol or alcohols which have combined with the formaldehyde nucleus.

Or the formula:

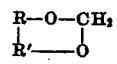

in which the residual radicals R and R' may be alike or different, but are joined to each other in the molecule.

The class of compounds which are thus found to be applicable for embalming purposes are structurally composed of a formaldehyde residue and a monohydric or polyhydric alcohol of aliphatic derivation. Such compounds may be represented by the formulas:

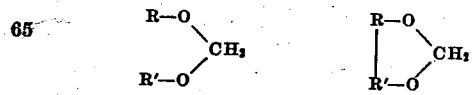

Or the compound may be of the formula:

In which the residual radicals R, R' may be alike or different groups, but are joined to a third radical R'' as in the trihydric alcohols such as glycerol.

For example, the following compounds are typical of those corresponding to the above formulae which may be used in the present invention:

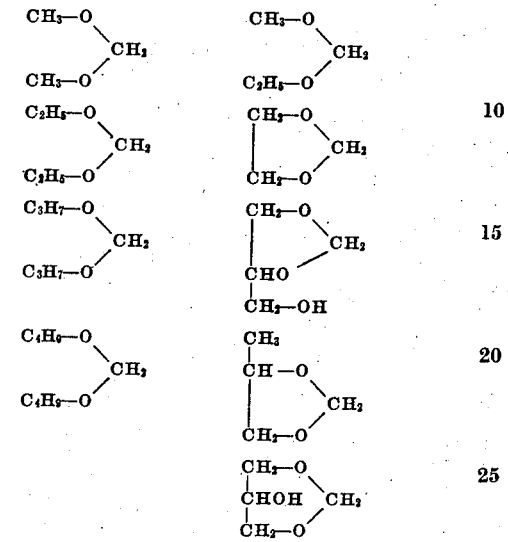

The preparation of these compounds may in general be effected by direct reaction of the alcohol in question with the aldehyde such as formaldehyde, under conditions effective to remove the liberated water of reaction as well as any aqueous component accompanying the reagent materials used.

Thus, using the symbols as above defined, the alcohol and aldehyde (formaldehyde) may react as follows:

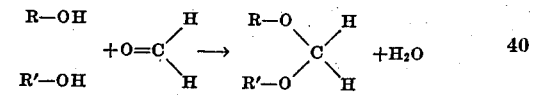

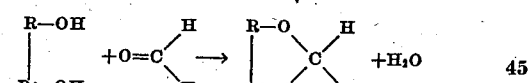

or

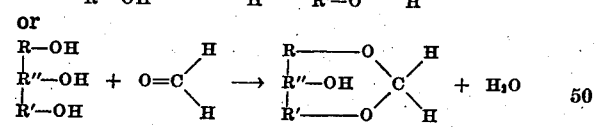

While glycol formal is of itself freely and completely soluble in water and hence inherently competent to dissolve and disperse freely and uniformly into and throughout the aqueous fluids of the body or the vascular system, it is also a fact that some of the acetals or formals are only partially soluble in water. Accordingly, the use of acetals or formals for embalming, which are of low solubility in water, requires their solution or dispersion in a medium which will provide sufficient concentration and also bring about a condition wherein the advantageous properties mentioned above as being inherently present in glycol formal, will be rendered effective. Glycol formal itself is highly suitable to serve as such a medium, since by its addition in sensible proportions to the less soluble acetals, it dissolves and renders these acetals or formals freely and completely soluble in water. While glycol formal is notable for this ability to render other acetals soluble in water, a like degree of solubility can be given to acetals by mixing them with methanol, ethanol and/or propanol, which are well known aliphatic alcohols.

When the acetals discussed above are used (either in the pure condition or in mixtures) for embalming, and have been diffused through the vascular system, cavities and tissues of the body, the acid and generally reactive character of the body compounds are then effective to cause their hydrolysis, liberating formaldehyde. Such dissociation may be substantially complete and accordingly the amount of free formaldehyde rendered available substantially corresponds to the formaldehyde component of the acetal compound. In such hydrolysis water is taken up, and this will be extracted from the body fluids in certain cases, when the pure compound is used, and thus avoid the necessity of injecting excessive volumes of the embalming fluid. Where this is not necessary or desirable, however, the compound may be diluted to the desired concentration with water, or other compatible liquid solvents or reagents, in preparing the embalming fluid composition in the condition in which it is to be used.

The compounds above described are in all cases freely flowing liquids under ordinary atmospheric conditions or can be readily dissolved in glycol formal or in alcohols to give freely flowing liquid solutions, of relatively low viscosity, not readily vaporized or solidified, but susceptible to ready dispersion and diffusion over and through the body tissues and hence capable of use, per se. Their aqueous solutions are likewise stable, free-flowing, uniform and penetrative, becoming labile in the presence of body fluids, cells, tissues, etc. Therefore, either the pure compounds, or aqueous solutions of the same, or compositions containing them to which other compatible and soluble agents have been added, lend themselves directly to use as embalming fluids, by injection, in accordance with the usual practices and technique of the modern art of embalming.

The improved effects of such compounds are that the embalming fluid and its effects are more uniformly distributed throughout the body, develop gradually and generally, rather than suddenly and locally, and can be controlled accurately by the amount and concentration of the embalming fluid employed. Moreover, upon hydrolysis of these compounds and concurrent liberation of the formaldehyde, the alcohol radical component is also hydrolyzed and liberated to form the alcohol. Such alcohols are beneficial in various ways, since one or more of the monohydric alcohols is often added to embalming fluid compositions. But the polyhydric alcohols are also very effective as emollients or softening agents upon the embalmed walls and contents of the vascular system generally and of associated walls, tissues, cavities, etc. Accordingly, as they are liberated after extreme diffusion throughout the body they are intimately distributed over the surfaces and through the substance of the cells and tissues, and preserve the latter in softened condition, simultaneously with the embalming action of the liberated formaldehyde thereon.

Although various other ancillary reagents, such as the water and alcohol solvents, and the formaldehyde and polyhydric alcohols subsequently derived from the acetal or formal compound or compounds used, upon hydrolysis, are beneficial in their several capacities as above pointed out, nevertheless, in the embalming fluid as it is prepared and used, the acetal or formal reagent is the essential active ingredient for accomplishing the results of the present invention.

A typical and preferred example of the group of compounds of the present invention is glycol formaldehyde. This may be prepared by treating formaldehyde, conveniently in anhydrous condition as para formaldehyde, with ethylene glycol, in the presence of a dehydrating agent such as sulphuric acid. The amounts used may be related as follows:

|  | Grams |
| --- | --- |
| Para formaldehyde | 300 |
| Ethylene glycol (a 4% excess over the theoretical amount required) | 645 |
| Sulphuric acid 1.84 sp. gr. | 10 |

These reagents are placed, in the order named, in a 2 liter boiling flask, which is fitted with a distilling head, a thermometer and a condenser. Heat is applied gently and gradually increased so that the temperature of the contents will not exceed 50° C. until the solid para formaldehyde is completely dissolved. The heating is then increased taking 3 hours to bring the liquid to a boil, which occurs when the vapors within the flask show a temperature of about 75° C. The volatile portion is then distilled out of the flask, condensed and collected until the vapors within the flask show a temperature of 95° C.

At this point the condensed distillate amounts to about 850 grams in weight and consists primarily of the products of the chemical reaction as above indicated, namely water and glycolformal. This distillate may be separated from its water content by shaking successively with four separate portions of 25 grams each of sodium carbonate. Each of these takes up and is dissolved in the water, the resulting solution or wet solid carbonate separating from the glycol formal and being removed therefrom by decantation or filtering.

It will be observed that in the reactions for the formation of these compounds from the alcohol and formaldehyde, water is liberated.

Conversely, if they are used for embalming by direct injection, in pure condition and without dilution with water, they hydrolyse to reform the original compounds and in so doing must chemically abstract water from the tissues, vascular system and body cavities to which they have penetrated and through which they are diffused. If such de-hydrating effect is not desired, the compound may of course be partially or considerably diluted by the addition of water or other freely miscible solvent liquid of appropriate composition and properties, before being used in the embalming operation.

The compound, either in pure condition, or in solution as above described is used by injecting into the tissues and the vascular system of the body at various points and into the body cavities, in accordance with the technique of those skilled in the art and also in accordance with the properties of the composition or compositions used, as herein disclosed and described above. The rapid and uniform diffusion of the fluid throughout all portions of the body is readily effected and the subsequent gradual and automatic conversion thereof to free formaldehyde and free alcohol progresses to completion. The formaldehyde liberated accomplishes the embalming action and the alcohol simultaneously provides a mollifying agent, to offset the de-hydrating tendency, if present, especially when concentrated solutions or the pure reagent itself is used.

The procedure of embalming as herein mentioned refers to the conventional art or technique of preserving dead human bodies by application of chemicals to the tissues of the bodies, within the tissues, at suitable temperatures and pressure and other physical conditions, and using the usual conveyances and appliances which promote the convenience of applying the chemicals and the efficiency of their action.

I claim:

1. A method of embalming, comprising injecting into the vascular system, tissues and cavities of the body an embalming fluid characterized by containing an acetal as an active ingredient and by permeating the tissues and fluids of the body and subsequently reacting to form or liberate free aldehyde.

2. A method of embalming, comprising injecting into the vascular system, tissues and cavities of the body an embalming fluid characterized by containing a formal as an active ingredient and by permeating the tissues and fluids of the body and subsequently reacting to form or liberate free aldehyde.

3. A method of embalming, comprising injecting into the vascular system, tissues and cavities of the body an embalming fluid characterized by containing a formal of a monohydric alcohol as an active ingredient and by permeating the tissues and fluids of the body and subsequently reacting to form or liberate free aldehyde.

4. A method of embalming, comprising injecting into the vascular system, tissues and cavities of the body an embalming fluid characterized by containing a formal of a dihydric alcohol as an active ingredient and by permeating the tissues and fluids of the body and subsequently reacting to form or liberate free aldehyde.

5. A method of embalming, comprising injecting into the vascular system, tissues and cavities of the body an embalming fluid characterized by containing a formal of a polyhydric alcohol as an active ingredient and by permeating the tissues and fluids of the body and subsequently reacting to form or liberate free aldehyde.

6. A method of embalming, comprising injecting into the vascular system, tissues and cavities of the body an embalming fluid characterized by containing glycol formal as an active ingredient and by permeating the tissues and fluids of the body and subsequently reacting to form or liberate free aldehyde.

7. A method of embalming, comprising injecting into the vascular system, tissues and cavities of the body an embalming fluid characterized by containing glycol formal, in solution, as an active ingredient and by permeating the tissues and fluids of the body and subsequently reacting to form or liberate free aldehyde.

8. An embalming composition, comprising an acetal as an active ingredient.

9. An embalming composition, comprising a formal as an active ingredient.

10. An embalming composition, comprising a formal of a monohydric alcohol as an active ingredient.

11. An embalming fluid, comprising a formal of a dihydric alcohol as an active ingredient.

12. An embalming fluid, comprising a formal of a polyhydric alcohol as an active ingredient.

13. An embalming fluid, comprising a glycol formal as an active ingredient.

14. An embalming fluid, comprising a glycol formal, in solution, as an active ingredient.

WILLIAM B. O'BRIEN.